Dec. 16, 1930.   E. G. GOODWIN   1,785,622

COTTER PIN

Filed May 11, 1929

INVENTOR
E. G. GOODWIN
BY H. H. Snelling
ATTORNEY

Patented Dec. 16, 1930

1,785,622

UNITED STATES PATENT OFFICE

ERNEST G. GOODWIN, OF PELHAM, NEW YORK, ASSIGNOR TO STANDARD COUPLER COMPANY, OF NEW YORK, N. Y., A CORPORATION OF NEW JERSEY

COTTER PIN

Application filed May 11, 1929. Serial No. 362,241.

This invention relates to cotter pins and has for its object the provision of a simple and efficient securing means which is automatically opened by the driving of the cotter pin into the hole in the bolt, pin, shaft or other object.

In spite of the innumerable designs of cotter pins no one type has been able to stand out predominantly in the field, each having some disadvantage so that at the present time it is the nearly universal practice to use a simple cotter pin having two parallel legs of practically the same length either beveled or not and with the usual round eye. When correctly applied this cotter pin is as satisfactory as required and its disadvantage comes solely thru the fact that at times even a careful workman will neglect to spread the ends of the cotter pin to the proper anchor shape after applying it and as a consequence of his failure to open the ends, the cotter pin will be lost and the parts which the cotter pin should insure being held together will separate.

Self-locking cotter pins are not new but the disadvantage or distadvantages inherent to each type are such as to prevent or hinder their use, or else the advantage or advantages are not sufficient in number and/or in merit to warrant their general use. The disadvantages generally are the failure of some part of the cotter pin or the pin is entirely too complicated and impractical. There seems to be an absolute rule that to be a success the cotter pin must consist of one single piece of material as the presence of an extra wedge of any kind not only adds greatly to the cost of manufacture but decreases materially the resistance to rust.

Where one end of the cotter pin is bent back on itself and the two termini which are spaced away from the end of the cotter are beveled an excellent wedging is had but the type is not successful because of the breaking of the cotter at its end since it is quite essential that the longer leg of this type of cotter shall be entirely closed on itself, flat side to flat side, to enter a cotter pin hole of a diameter slightly greater than the diameter of the cotter as a successful cotter pin should snugly engage its bore. The type just described could of course be made solid at the upturned end but this would bring in a new disadvantage and one which would be absolutely fatal in this art, namely, the cost would exceed the price at which it could be sold as cotter pins are necessarily an article permitting of very slight profit to the maker.

This invention contemplates the provision of a one piece cotter formed of the ordinary cotter pin stock which is substantially half round but in which the sharp edges may be removed. I secure a highly efficient self-locking cotter pin by merely extending one leg beyond the other and by twisting the extended leg in the process of manufacture so as to bring its flat face, at some portion beyond the edge of the hole in which the cotter pin is placed, at right angles to the flat face of the other leg. The eye is made of sufficient size and shape that the blow which locks the cotter pin is given opposite the straight portion and the eye can yield sufficiently to allow the straight portion to engage or overlap the twisted portion.

In the drawings:—

Figures 1, 3:
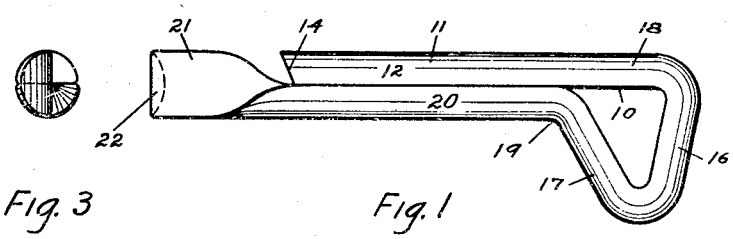
Figure 1 is a side elevation of the preferred form of my cotter pin.
Figure 3 is an end view.
Figure 2:
Figure 2 is a top plan view.

The cotter pin of this invention is bent from standard cotter pin stock in which 10 is the flat face and 11 is the half round characteristic of this stock. This leg 12 is preferably perfectly straight and may have a pointed end or a beveled end as at 14 or it may have a straight end as at 15 in Figure 7. The stock is bent at an angle of about 60° to form a short portion 16 and again bent at the same angle to form a second short section 17 so that the extension 18 of the straight leg 12 forms with the two short sections substantially an equilateral triangle. If the triangle is equilateral the bend at 19 is 120° but in any event is such as to bring the leg 20 into parallelism with the leg 12 and making the triangle isosceles.

The leg 20 however extends beyond the end 14 of the leg 12 and beyond such end the leg 20 is twisted sharply thru an angle which should be at least 90° and which I prefer to be about 100°, the purpose of the additional twisting being merely to insure that at some portion the flat side of the leg 20 shall be perpendicular to the plane of the flat side of the leg 12. As best seen in Figure 1 the twisted extremity of leg 20 is of very slightly less height than the combined height of the legs 12 and 20, this lesser height being due to the removal of the sharp edge which would otherwise exist at the junction of the flat face 10 with the cylindrical surface 11. As seen in Figure 3 however it will be noted that the twisting of the extended portion of leg 20 never projects any portion beyond the cylindrical surface of the hole into which the cotter pin is to be placed, no matter how snug the fit.

Figures 6, 7:
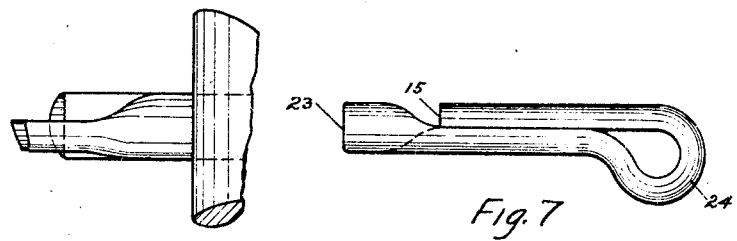
Figure 6 is a bottom plan view.
Figure 7 is a view similar to Figure 1 but showing a slightly different eye, a twist in the reverse direction of the extended end, and showing square ends to the stock.

The free end of the extension is flat or straight as at 21 at its end the tip of which may be beveled as at 22 or it may be flat as at 23 in Figure 7, the latter figure illustrating the flat side as being twisted away from the observer while the form illustrated in Figure 1 shows the flat side as being twisted toward the observer. There is obviously no choice between the two directions of the twist. The P-shaped eye 24 in Figure 7 is quite satisfactory for the purpose but I prefer the equilateral triangular eye of Figure 1 since by that form I can secure a greater amount of travel of the straight leg with the same weight of metal. The action of the two types however is exactly the same and there is no particular advantage in having the ends of the two legs beveled either from the flat side, across it, or to it or in pointing the longer leg save in the advantage that accrues by virtue of the slant or the point when inserting the cotter in its hole, particularly in locating the cotter pin receiving hole in a dark location or one where clear access may not be had.

Figures 4, 5:
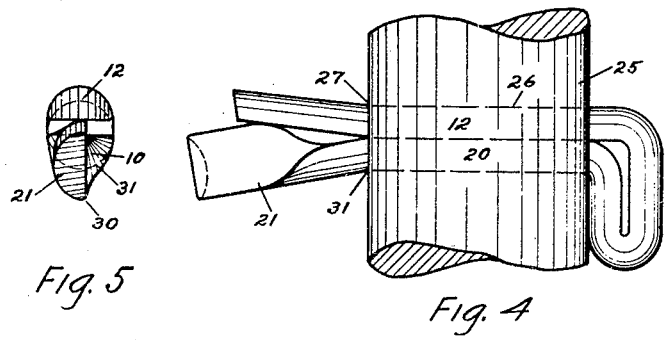
Figure 4 is a side elevation similar to Figure 1 but showing the cotter pin after being driven into its hole.
Figure 5 is an end view of the cotter pin shown in Figure 4.

In Figures 4 to 6 the cotter pin is illustrated as in place in the object 25 which has a cylindrical bore 26 therein. This object can obviously be a bolt, a pin, a pivot shaft, or any other piece requiring generally the use of a cotter pin. The action is probably best seen in Figure 5. The straight leg 12 fits the hole snugly at the top of the mouth 27 of the bore 26 but is tilted slightly upward having yielded in that direction as it forced the twisted end downwardly. This however only occurs in case the cotter pin is perfectly free to expand as it would in the case of an extended pivot pin. More usually however one side of the cotter pin strikes against the work itself and the entire deflection is then in the other direction as will be obvious to those skilled in the art. Since the flat face 10 of the section 20 is substantially vertical and is practically the same dimension as the hole the bottom end 30 of this deflected end will be positioned considerably below the bottom margin 31 of the hole and therefore any axial blow given to the end of the twisted leg or to both legs will simply wedge the cotter pin the more tightly, now that the straight leg projects at least as far as that portion of the twisted end that is at 90° to the plane of the flat face of the straight leg.

To remove the cotter pin of this type we first strike the longer leg (the twisted one), knocking it to one side in order to lock this leg against backing up, then we tap gently on the straight leg and drive it back past the twisted end and follow this by straightening up the twisted end at which time the cotter may readily be withdrawn by pulling the eye end. Sometimes, particularly in the smaller sizes, the withdrawing action can be accomplished by the insertion of a flat tool in the eye and the turning or rotating of the tool in a direction tending to pull out the straight side and to keep the twisted side from following.

What I claim is:

1. A retaining device of cotter pin stock consisting of two legs and an eye, characterized by the projection of one leg beyond the other and said projected end being twisted about the axis of the pin.

2. A cotter pin of a single piece of stock having a flat face, said cotter pin consisting of a leg, an eye extending laterally from said leg at one side only, and a second leg having its flat face in substantial engagement with the flat face of the first leg, said second leg extending beyond the free end of the first leg and being twisted axially in its extended portion, such twisted portion not extending laterally beyond the projection of the cylindrical surface bounding the central portions of the two legs.

3. A cotter pin of half round stock having an eye and two legs substantially in contact on their flat faces, one leg extending beyond the other and being twisted axially in its extended portion only, said eye extending laterally on one side only of both legs.

4. A cotter pin of half round stock consisting of two legs of substantial equal length connected by an eye which is expanded to hold one leg beyond the other at its free end, such extended portion being twisted to bring the flat face of the twisted portion into a plane at right angles to the plane of the non-extended leg.

5. A one piece cotter pin of cotter pin stock of half round section having two legs parallel with flat face to flat face for a portion of their length and one leg extending beyond the other, an eye portion having two sides joining said legs, the extended portion of the extended leg being twisted about the axis of the cotter pin, the size of the eye being such that when the two sides of the eye are crushed together the non-extended leg engages the twist in the extended leg.

6. A cotter pin of half round stock having a straight section with a beveled end, a second straight section parallel and engaging the first section flat side to flat side and with a beveled end and extending beyond the end of the first section said extension twisted thru an obtuse angle to bring the flat side of the stock at the end at substantially right angles to the plane of the proximate flat sides of the two sections, and two short sections of equal length forming with the eye end of the first and the second sections an equilateral triangle with the flat side in, the base of such triangle being of such length that when the base of the first section is struck in the direction of the length of the cotter pin when in its hole, the beveled end of the first section will ride on the twisted end of the second section and cam such twisted end laterally beyond the margin of the hole so as to prevent withdrawal of the cotter pin.

7. A one-piece cotter pin of half round stock having two legs and being bent to form a laterally extending collapsible eye at the junction of the legs, one of said legs having that portion of its flat face within the cotter bore in one plane and having that portion of its flat face beyond the bore in a plane at right angles to the plane of the face within the bore.

8. A one-piece cotter pin of half round stock having two legs and a laterally extending collapsible eye, said legs having their flat faces in the same plane for a portion of their length, one of said legs extending beyond the other, said extended leg having a sharp axial twist beyond the other leg and ending in an untwisted portion.

In testimony whereof I affix my signature.

ERNEST G. GOODWIN.